United States Patent [19]
Downs et al.

[11] Patent Number: 6,067,553
[45] Date of Patent: May 23, 2000

[54] IMAGE DATA TRANSFER SYSTEM USING OBJECT REFERENCE TABLE

[75] Inventors: Iain Macauley Downs; Neetu Jain, both of London, United Kingdom

[73] Assignee: The Dialog Corporation plc, London, United Kingdom

[21] Appl. No.: 08/913,672

[22] PCT Filed: Mar. 19, 1996

[86] PCT No.: PCT/GB96/00656

§ 371 Date: Dec. 15, 1997

§ 102(e) Date: Dec. 15, 1997

[87] PCT Pub. No.: WO96/29658

PCT Pub. Date: Sep. 26, 1996

[30] Foreign Application Priority Data

Mar. 21, 1995 [GB] United Kingdom .................... 9505741

[51] Int. Cl.[7] .................................................. G06F 15/00
[52] U.S. Cl. .......................... 707/523; 707/513; 707/514; 707/517; 707/101; 395/117

[58] Field of Search ................................. 707/513, 514, 707/517, 523, 101, 2; 395/117

[56] References Cited

U.S. PATENT DOCUMENTS

| | | | |
|---|---|---|---|
| 5,029,112 | 7/1991 | Sakamoto et al. | 345/418 |
| 5,355,472 | 10/1994 | Lewis | 707/101 |
| 5,408,655 | 4/1995 | Oren et al. | 707/501 |
| 5,446,891 | 8/1995 | Kaplan et al. | 707/2 |
| 5,530,852 | 6/1996 | Meske et al. | 709/206 |
| 5,638,498 | 6/1997 | Tyler et al. | 395/117 |
| 5,696,918 | 12/1997 | Barker et al. | 707/513 |

*Primary Examiner*—Wayne Amsbury
*Assistant Examiner*—Mark Terry
*Attorney, Agent, or Firm*—Richard M. Goldberg

[57] ABSTRACT

Structured graphical data is reorganised. The data, which may be defined in accordance with portable document format (PDF) includes graphical object definitions and references to said definitions. The data is reorganised so that the graphical object references are preceded by their respective object definitions.

10 Claims, 14 Drawing Sheets

| Start Of File | Object Definitions For Page 213 |
|---|---|
| | Page Definition 213 |
| | Object Definitions For Page 214 |
| | Page Definition 214 |
| | Logo 201 Definition |
| | Font 202 Definition |
| | Font 203 Definition |
| | Graphic 205 Definition |
| | Page Definition 215 |
| | Catalogue 211 |
| | Xref 501 |
| End Of File | Four-Byte File Offset Pointer |

Figure 11

IMAGE DATA TRANSFER SYSTEM USING OBJECT REFERENCE TABLE

The present invention relates to a system for making data available to a plurality of viewing stations, comprising data storage apparatus and means for writing received data to said data storage apparatus, wherein said writing means receives data defined in accordance with a standard document format having object definitions, references to said definitions and a structure table.

INTRODUCTION

Over recent years advances have been made concerning the speed of data communication over existing telecommunications networks. With appropriate interfacing equipment, existing speech-based telephone lines may be used for transferring significant amounts of data between data processing environments. Such interfacing circuits transmit data over the speech-based telephone lines by a process of modulation and a complementary process of demodulation is then performed at the receiving station; a device capable of performing both of these operations is generally referred to as a modem.

Various advances in the design of modem circuitry have facilitated significant improvements to the rates at which data is transmitted over existing telephone lines. Furthermore, additional improvements have recently been achieved by the establishment of data compression standards. These enable greater data rates of data transfer to be achieved by the removal of redundancy within binary code streams and by the use of code libraries, that provide a digital shorthand for those binary codes which are most often used, such as codes representing selected letters of the alphabet.

Alternatively, dedicated high-speed data communications lines, such as the integrated services digital network (ISDN) may be used. Thus, as a result of improvements made in speed of data communication over telecommunications lines, services are now provided to customers generally referred to as "on-line" services.

Many standards exist for the transmission and reception of data. The most widely used of these is the American Standard Code for Information Interchange (ASCII). ASCII represents symbols and characters of the English alphabet with seven or eight bit binary codes. A large amount of information stored on remotely accessible databases is stored by means of ASCII codes and when a database is accessed using a suitably configured terminal, ASCII data is transferred to the terminal, with each ASCII code representing a letter of the alphabet, a numerical value or a simple symbol. In addition, some special codes are also defined to provide line feed, tabulation, new page and other simple text-related features.

The appearance of ASCII files, received by a suitable terminal, is not very elegant. Even subtle variations in text format, such as font size and appearance, underlining and italics, cannot be achieved using the accepted ASCII protocol. Thus, a file which was originally part of a magazine article, for example, and which included various sizes of text and various fonts for sub-headings etc. must have substantially all of this layout information removed if it is to be rendered as a sequence of ASCII symbols for transmission purposes. Furthermore, this process is not suitable for the transmission of associated illustrations and graphics etc.

A standard for data communication between computers and printers has been developed by Adobe Systems Incorporated and marketed under the trade mark "PostScript". PostScript defines a large number of codes for communicating complex text and graphics in a variety of presentations. Full typesetting information may be defined within a PostScript file, which may be previewed on a small office printer having a medium resolution of a few hundred dots per inch. Once a satisfactory result has been achieved, the file may then be sent to a professional printing house where high quality artwork may be generated using a printer having a resolution of several thousand dots per inch. Thus the PostScript standard has become firmly established as a method of storing and transmitting high quality text and graphical documents.

The widespread acceptance of the PostScript format for communication to printers has led to the development of a related format, which is intended to be used for storing and browsing through documents on a terminal equipped with a graphics monitor. This format, abbreviated to the three-letter suffix PDF (Portable Document Format) provides a solution to many of the problems associated with ASCII. A PDF file of a magazine article, for example, may appear almost identical to the original document when viewed on a suitable high resolution graphics monitor. Furthermore, it is possible for a PDF file to be generated directly from the same PostScript file that was sent to the publisher's printing house. Full technical documentation of the PostScript and PDF formats is available from Adobe Systems Incorporated.

It is known that mixed graphics and text files, such as PDF files, are much larger than those containing unformatted ASCII text. It is not unknown for such files to be several tens of megabytes long. Thus, while providing the ability to represent practically any document written using any alphabet and containing any number of pictures, even in full colour, PDF files have the disadvantage that their length may result in a considerable delay when they are being downloaded as a part of an on-line service.

A PDF file may take several minutes per megabyte to download even using a fast modem. A further difficulty with PDF, and other structured graphical formats, is that it is not possible to view the contents of the file before the entire contents of that file have been transferred into the viewing terminal's memory. Thus many of the advantages of being able to view database information on a graphical display are offset greatly by the inability to view the file's contents as they arrive. The time during which a document's contents are being downloaded may not be used for work requiring that document's contents. This time may be tens of minutes, or even an hour or so, which is time wasted.

SUMMARY OF THE INVENTION

According to a first aspect of the present invention, there is provided a system for making data available to a plurality of viewing stations, of the aforesaid type, characterised in that said data is re-organised so that said graphical object references are preceded by their respective object definitions to facilitate incremental viewing of said data at remote terminals without reference to said table while maintaining said data as being compatible with the original document format.

BRIEF DESCRIPTION OF THE DRAWINGS

FIG. 11 shows a file structure created as a result of re-organising the file structure shown in FIG. 5;

DETAILED DESCRIPTION OF THE PREFERRED EMBODIMENTS

The invention will now be described by way of example only with reference to the accompanying drawings identified above.

Figure 1:
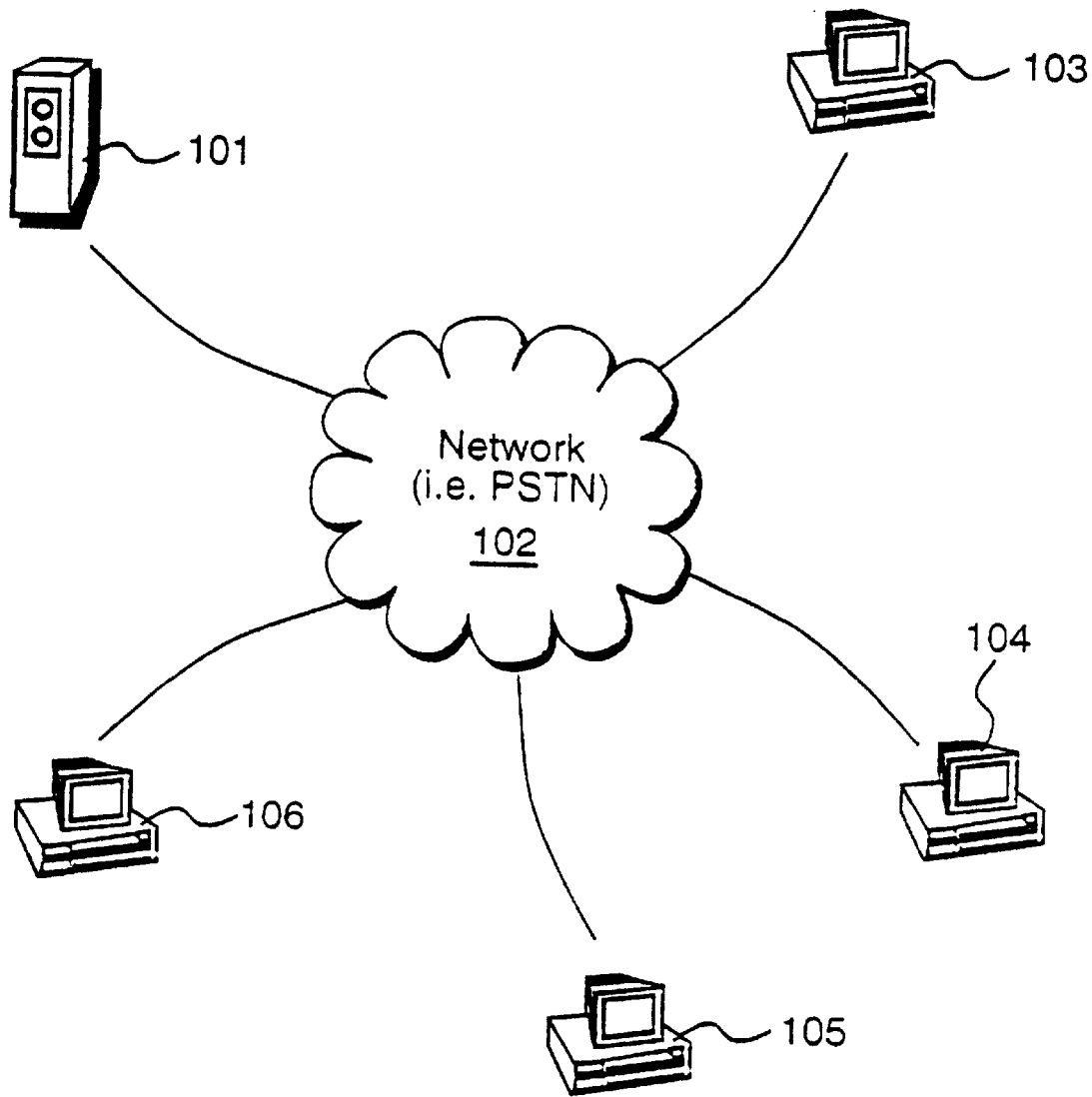
FIG. 1 shows a database connected to a public switched telephone network (PSTN), which is in turn connected to several remote viewing terminals.

A database file server 101 is shown in FIG. 1, connected to a public switched telephone network 102, over which mixed graphics files and formatted text files may be down-loaded to remote viewing terminals 103, 104, 105 or 106.

A user, located at terminal 103 say, may make a connection to the database server 101 by firstly dialling a telephone number, and then supplying digital signals over the telephone line to the database server 101 in order to establish that the user has an account and will pay for the database services provided. Typically the process of dialling a number and supplying codes is automated, such that the user located at terminal 103 need only type in a short sequence of keyboard commands in order to facilitate a connection to the database file server 101.

Having established access to the database file server 101, the user will be provided with a number of search category options. By searching a particular category, it becomes possible to perform additional searches in which the search category is progressively restricted. By reducing the search scope at each iteration, it becomes possible to define highly specific data categories within an extremely large database.

The database server 101 may include several hundred megabytes or gigabytes of accessible information, in a variety of different formats including ASCII and PDF. Thus it is necessary at an early stage to establish which of these formats and which of the files are of interest to the user.

Typically a database will contain information on a variety of subjects, and from a wide variety of sources. For example, the user may be interested in a particular company report, recently published. For example, from an initial set of options including Commercial, Academic and Hobby subject matters, a user may request 'Commercial'. Thereafter a different menu is displayed, containing the items: Company Reports, News, Stock Market and Analysis; from which 'Company Reports' is selected. This process is continued until the subject area of interest has been sufficiently defined in order to select an individual file or set of files for down-loading and subsequent browsing.

ASCII files provide an inferior quality of presentation when viewed on a graphics terminal 103. It is impossible for ASCII codes to convey information such as the type of font, size of font, and so on, as none of these are defined within the ASCII standard. Company reports often contain summaries in the form of simple graphs and bar charts and these could not be well represented, if at all, by an ASCII file.

Figure 2:
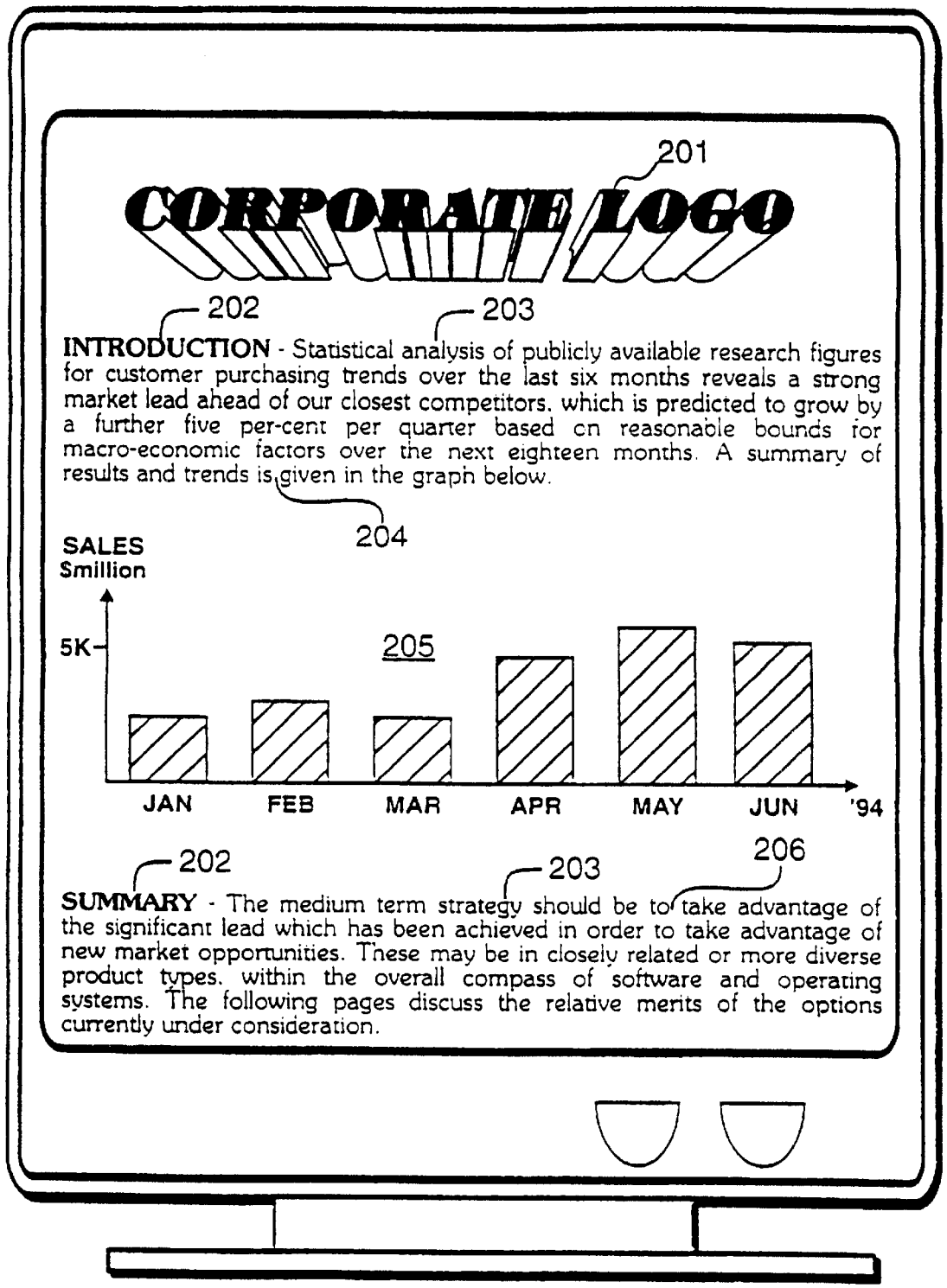
FIG. 2 shows an example of the type of document stored on the database shown in FIG. 1, accessible by the remote viewing terminals.

An example of the preferred form of presentation is shown in FIG. 2. Several different graphical objects are combined within the page, including text of different sizes and fonts, to provide a presentable and highly informative layout. Non-text graphical objects, such as a corporate logo 201 and a bar chart 205 may be included on the same page as text. A document containing the page shown is represented by a file, which contains a variety of codes and format descriptors in order to represent the various types of data in the format shown. These codes define various types of information, such as the type of font which is used by a particular section of text.

Within structured text of this type, font codes are used to define appearance, and sequences of ASCII codes are used to represent the text characters, up to the points where the style or font changes. This style of interspersing structural codes, with ASCII codes representing the actual characters, is known as 'formatted text'. Although ASCII codes are used in the file, the codes do not necessarily have to represent characters from the latin alphabet; they could also be used to represent Japanese Kanji characters, or similar complex characters, provided that a suitable font is available.

The page shown in FIG. 2 includes two basic object types: graphics 201 and 205 and text 204 and 206. There are a multitude of different types of graphic objects which may be included in a PDF file, such as bitmapped graphics, JPEG (highly compressed) pictures, and vector graphics. For simplicity of explanation, the graphical objects 201 and 205 in the example will be assumed to be of the vector type, i.e. consisting of curves and lines of particular types. The concepts which will be described can be applied to the other graphic types which are defined within the PDF standard. Details of the PDF standard are available from Adobe Systems Incorporated, and from several on-line database sites.

The corporate logo 201 shown in FIG. 2 is stored as data which defines the shape of the outline and the fill pattern of the component parts of the logo. In this example, the logo 201 has been stored in a vector graphic format. Thus, for example, the "C" of the word "corporate" is defined by a sequence of graphic commands which may be supplied to a graphical display processor in order to render the image of the "C" on a visual display unit. The front face of the "C" has a plain black fill pattern, while the projected perspective has a plain white fill pattern: These attributes are included along with the vector data in order to define the appearance of the letter "C". Furthermore, the overall location of the corporate logo on the page shown in FIG. 2 is given a pair of xy co-ordinates. Thus the corporate logo 201 consists of a number of different items of data defining the outline, appearance and location of the logo and an initial data sequence is used to identify the logo as being a vector graphic object.

The text 204 immediately below the corporate logo 201 includes two different fonts 202 and 203. Thus, in order to define the paragraph of text 204, an initial data code declares that the following data is being used to represent some text. This is followed by data which defines the location of the first character of text, as an xy co-ordinate, the font which will be used, i.e. font 202, the size of that font, and several other details of the text attributes such as line spacing, paragraph justification style (which may be left, right, or full) the fill style for each character, tabulation spacing, and so on. The details of the data which are supplied, and the coding methods are described in the detailed documentation of the PDF format available from Adobe Systems.

Having defined the initial font as being the bold-faced font 202, the first word of the paragraph of text 204 may be coded as a short sequence of ASCII codes; each one corresponding to a character in the word "INTRODUCTION". Thereafter a different font 203 is used, and a font change command is embedded in the text data in order to signify that this is the case. Thereafter ASCII codes representing each of the characters for the rest of the paragraph are used to define the remainder of the text 204.

The bar graph 205 is defined as a series of vectors in much the same way as the corporate logo 201. This is the simplest form of explanation. However, it is possible that the text used within the bar graph 205 has been stored as a character stream subset of the vector drawing. Thus, within the vector commands which define the bars on the graph, a sequence of commands may be used to define each of the names of the months as short sequences of text at various locations on the page. This has the advantage that the letter R, for example, need only be stored once as part of a font definition, rather than being stored twice as the same set of vectors but having different horizontal offsets on the page. In a more complex drawing, or over several pages of a company report, this could provide a significant saving in the size of the PDF file.

PDF text may be considered as a special type of graphical object. Each character within a font is defined by a unique set of vectors. This set of vectors is sometimes referred to as a 'glyph'. Thus, one might imagine how a graphics processor initially creates a character on the screen of a visual display unit: an outline is drawn according to mathematical definitions of curves and straight lines, and certain areas are then shaded with a colour, usually black. Thus each character of text is drawn as an individual graphical object.

Within a paragraph of text several characters of text occur more than once. Thus, although it would be possible to define the same set of vectors twice, having different base xy co-ordinates, this is wasteful of available transmission bandwidth and would result in extremely large files being produced. For example a single character may require five hundred bytes of data to define its vectors, and only one byte is required to define which character it actually is. Thus if the letter A occurs ten times within a paragraph of text and each instance of the letter is stored as a sequence of vectors, five thousand bytes are required.

Alternatively, if the ASCII code for the letter A, which has the numerical value of sixty-five, is used to indicate which set of vectors should be used to draw the letter A, only five hundred and ten bytes are required. Furthermore, scaling factors may be used with the same set of vectors so that characters from the same font may be used to define text of varying sizes without the need to store vectors for each different character size used. These techniques, when used throughout a document, provide a high degree of data efficiency and compression.

An additional way of achieving efficient data use is to store vectors only for those characters which are actually used within a document. Most fonts include a set of vectors for more than two hundred different characters, which may include European accented characters, mathematical symbols and so on. The majority of these two hundred characters will not actually be used in a document, no matter how long it is, so storing the vectors of over two hundred characters is not necessary. It is only necessary to store vectors for those characters which are actually used within a document, and these vectors need only be stored once.

This is particularly beneficial where, as is common practice, only a dozen or so characters are used from one font—for example to provide subheadings, while fifty may be used for the main text which is in a different font. This can be seen in the example shown in FIG. 2. There are two paragraphs of text 204 and 206, each having a sub-heading in the bold-faced font 202, and the rest of the text in a standard font 203. Thus only a few characters of the bold-faced font 202 need have their vectors defined, while around thirty of the characters of the standard font 203 are needed.

Thus when generating a file containing a page of the type shown in FIG. 2, the sequence of data defining an area of text, such as paragraph 204, contains a reference to the type of font which is used, followed by the ASCII codes of the text. Once all of the text in the document has been stored as formatted text codes, it will then be known which of the characters of each font needs to be stored in the form of vectors. Thus at the end of the file there will be a store of font vectors required for each character which is used at least once within the text sequences located in the file.

In a large file, this approach may be beneficial not only for fonts but also for other types of graphical object. For example, the same corporate logo 201 may be used several times within the same document. Thus it would be wasteful to include the complete set of vectors defining the corporate logo at each instance within the file. Even if the logo is of a different size, the same set of vectors may be used to define it, multiplying each vector by an appropriate scaling factor.

Figure 3:
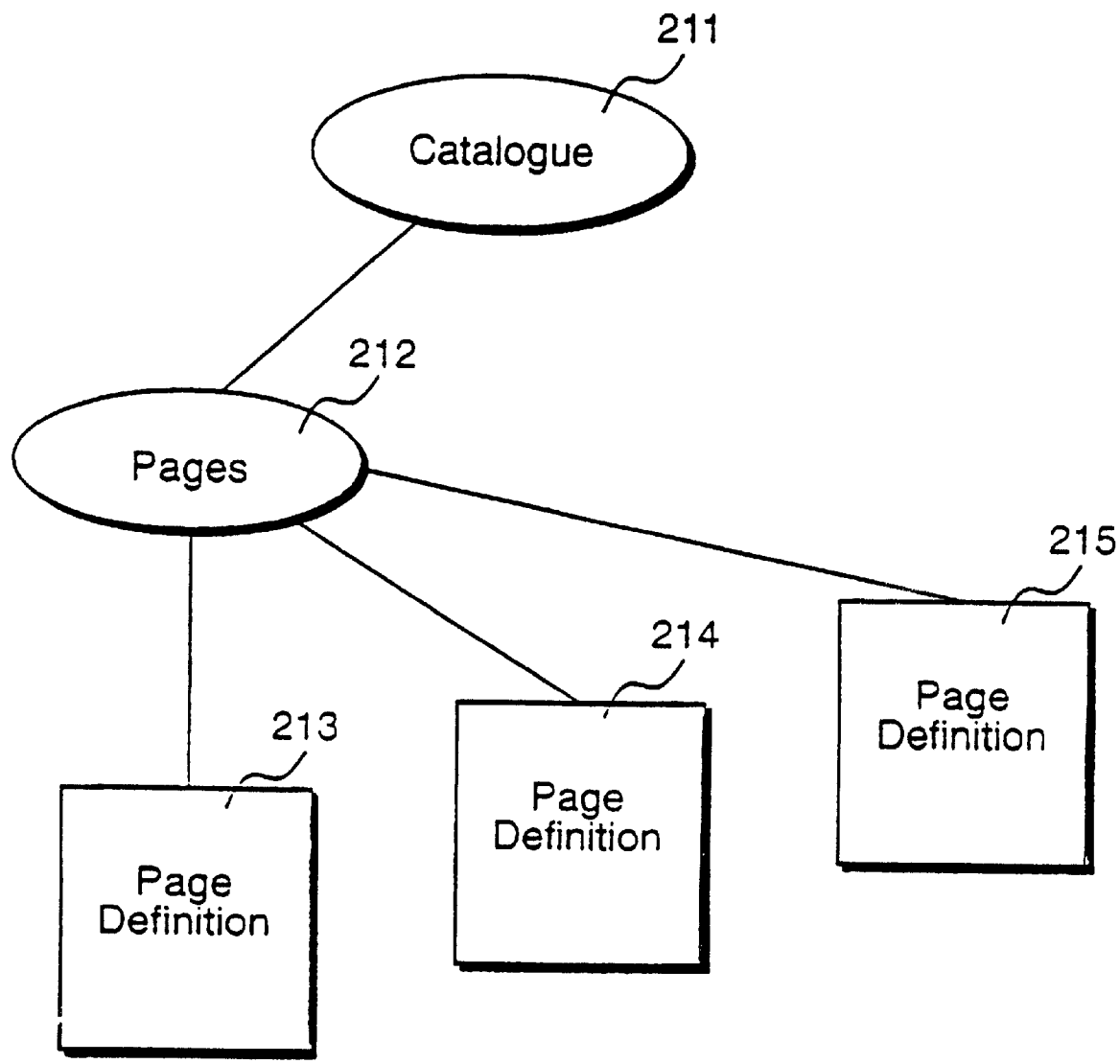
FIG. 3 shows an example of the data structure representing the file containing the page shown in FIG. 2.

FIG. 3 details a linked list structure which is used to define the structure of the file including the page shown in FIG. 2. The file contains objects 211, 212, 213, 214 and 215. Of these the catalogue object 211 is the 'root' of a linked list or tree structure. The catalogue object 211 contains references to other objects, such that the layout of the file's contents is defined. In the example shown, the catalogue object 211 contains a reference to another object 212, which in its turn contains a reference to several page objects 213, 214 and 215.

Figure 4:
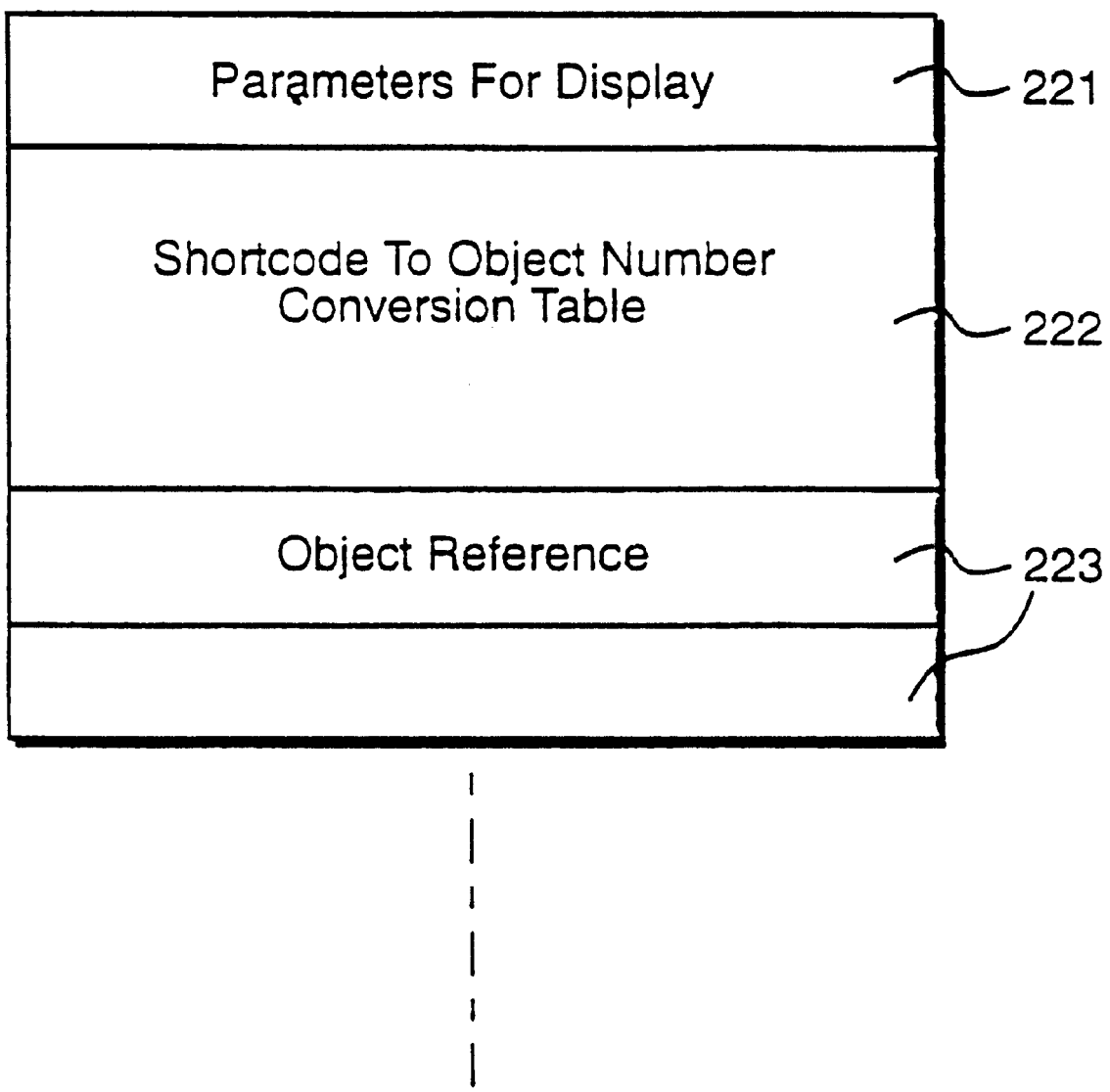
FIG. 4 shows the data structure in a page object for the page shown in FIG. 2.

An example of the page object 215 is shown in FIG. 4. The page object includes parameters defining the size of the display area 221, shortcode to object number conversion table 222 and several object references 223. The object references 223 provide a link to other objects which are to be displayed within the page, in a similar hierarchy to the one shown in FIG. 3, where pages form part of a document defined in the catalogue 211.

Thus all the objects shown in FIG. 2, such as the corporate logo 201, the paragraph of text 204, the bar graph 205 and so on, are objects whose definitions are referred to within the page definition shown in FIG. 4. All objects within a file are given an exclusive object number. The object numbers may be chosen arbitrarily, but for convenience in the description of the preferred embodiment, these are numbered starting with '1' and ending with 'n', which is the number of objects within the file.

Objects which are referred to within a page definition are referred to using a set of 'shortcodes' which are unique to each page of the document. Thus, when referring to a particular font for an area of text, the shortcode 'F0' will be used. Another area of text using a different font will indicate its font by the shortcode 'F1' and so on. However, a font definition is a type of object. Each object has its own unique object number. For example, the font 202 used for the subheading of the paragraph 204 of text shown in FIG. 2, is defined in a font definition which is object number 62.

The shortcode to object number conversion table 222 contained within the page definition shown in FIG. 4, provides cross references for each of the shortcodes used in the text of the page, with their respective object numbers as they are stored within the document. Further details of these methods are discussed, with examples, in the PDF documentation, available from Adobe Systems Incorporated.

Figure 5:
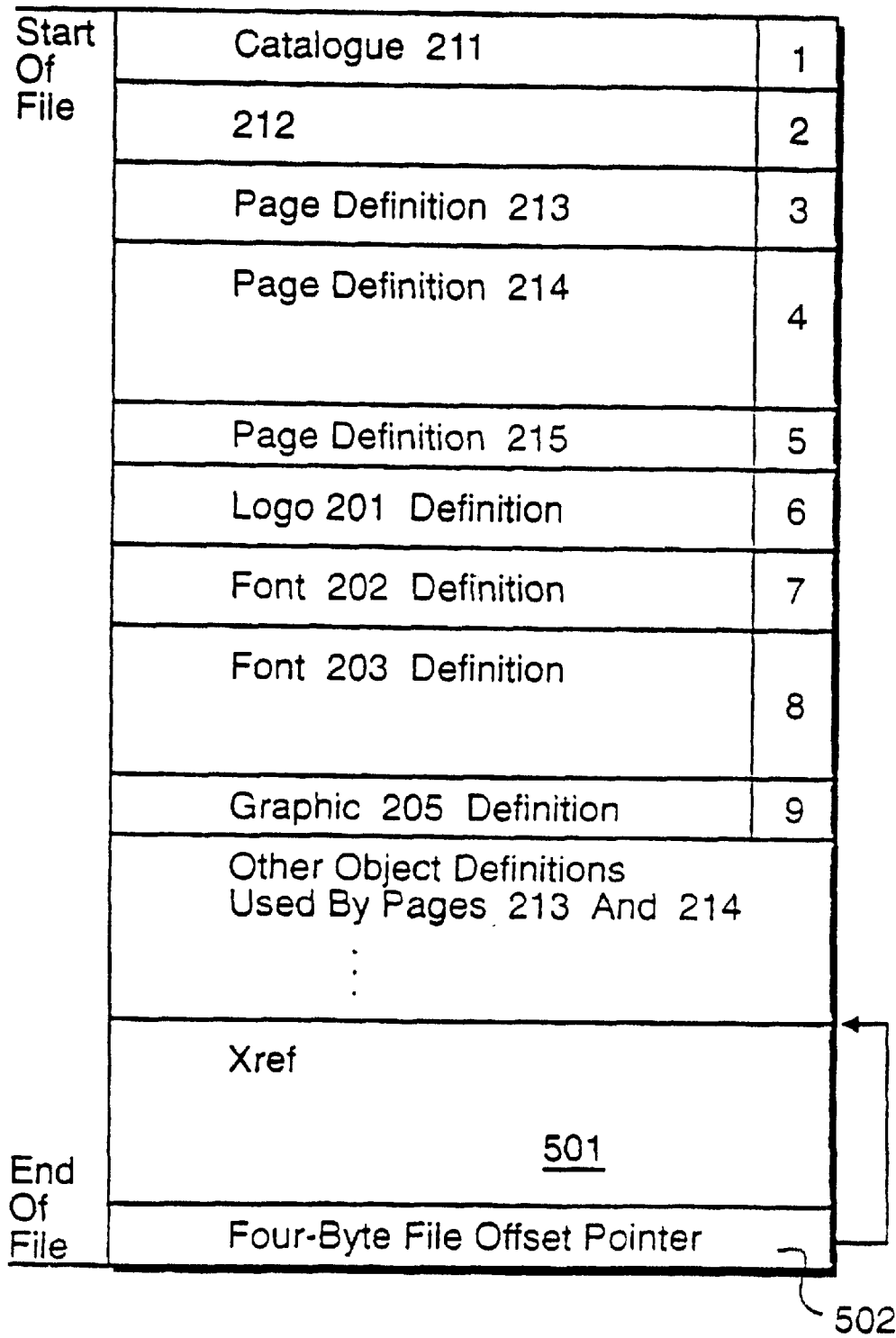
FIG. 5 details the normal structure of a PDF file used to represent the document shown in FIG. 3.

The data structure shown in FIG. 3 results in a file having the contents shown in FIG. 5. Each object, such as the catalogue 211, page definitions 213 to 215 and other objects are stored in the file one after the other. The sequential nature of the file structure requires the use of a cross-reference table 'xref' 501 in order to determine the actual locations in the file of each particular object. Thus within a page definition, the shortcode 'F0' may be associated with object number 7, which is a font definition 203. However, this information does not enable a viewing apparatus to determine where in the file the font definition actually occurs. The look-up table xref 501 contains a cross-reference of each object number with an associated file offset value. In practice, the PDF format makes the object number implicit, and simply lists the file offset value for each object, in the order in which the objects are numbered. Thus, the first entry in xref 501 contains the file offset of the definition of object number one. In the example shown in FIG. 5, object number 1 is the catalogue 211. The location or beginning of the cross-reference look-up table xref 501 is indicated by the contents of the four byte file offset pointer 502. Thus the location of xref 501 is only explicitly defined at the end of the PDF file.

Figure 6:
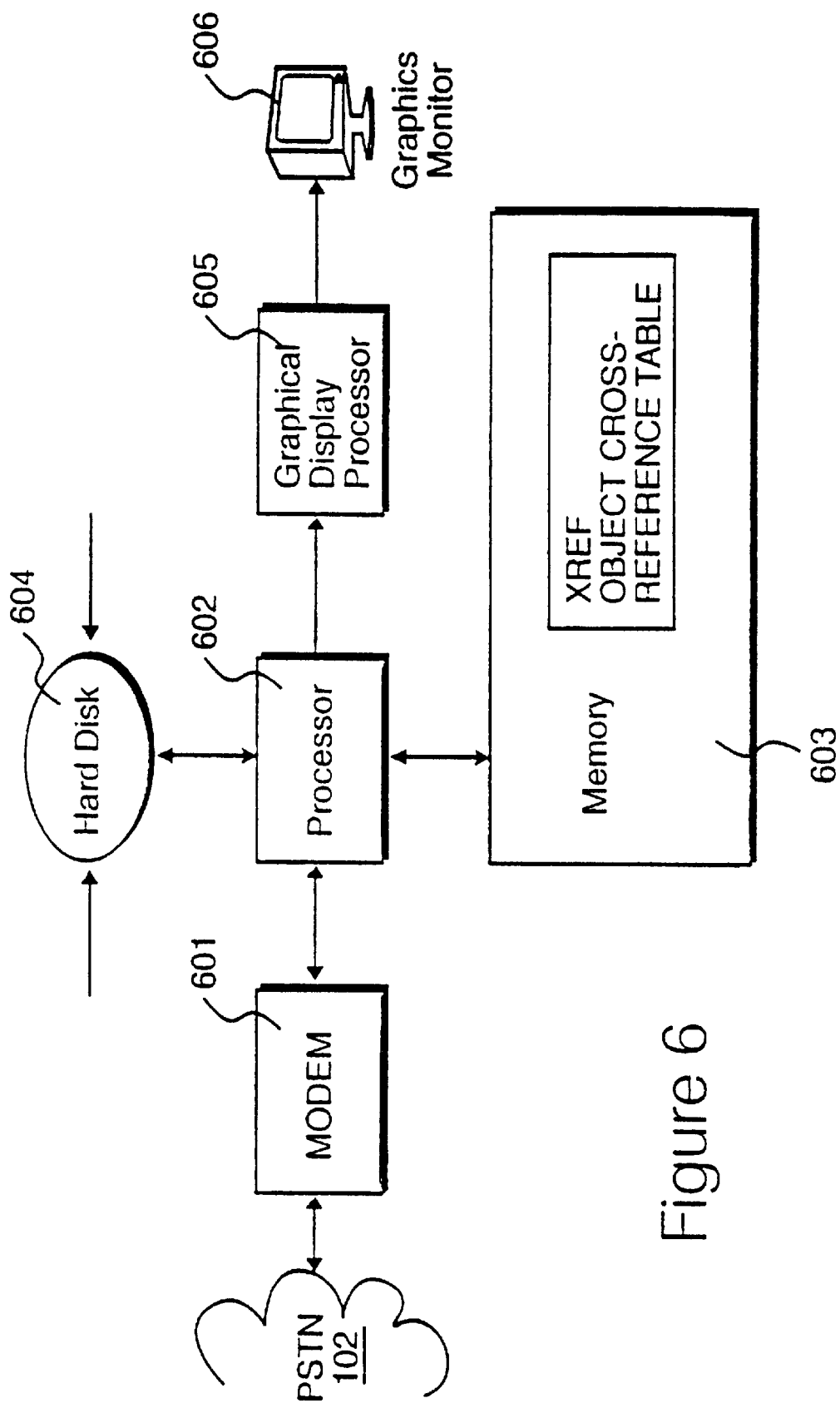
FIG. 6 shows a known graphics terminal.

A known apparatus for viewing PDF files having the structure shown in FIG. 5 is shown in FIG. 6. Thus the terminal 103, shown in FIG. 1, may consist of the equipment shown in FIG. 6. The terminal 103 may be used to view the contents of the file shown in FIG. 5. The file contents are down-loaded from the database server 101 in the order in which they are stored in the file shown in FIG. 5. References to objects, such as the catalogue 211, the pages 213 to 214 and so on, usually occur before definitions of the respective objects which they contain. Thus it is not possible to display page 215 as shown in FIG. 2, until all of the object definitions to which it refers have also been received.

Electrical signals representing binary bits (and also possibly including additional binary bits for forward error correction) are supplied to a modem 601. A processor 602 directs the incoming eight bit, or byte data to the memory 603 and/or the hard disk drive 604. Known systems are unable to supply instructions to the graphical display processor 605 until the entire contents of the PDF file have been loaded into memory 603 and/or the hard disk 604. This is because the four byte file offset pointer at the end of the file is used to determine the whereabouts of xref 501 in the file. Thus it is not possible for the processor to display objects having references early on in the file without access to definitions of their respective objects.

Once all of the contents of a file have been transferred to the memory 603, the processor 602 is then able to decode the contents of the file. As a result of this process, it is then possible to generate suitable instructions for the graphical display processor 605, which in turn generates electrical signals for displaying the file on the graphics monitor 606.

Using equipment of the type shown in FIG. 6, the user is unable to view the contents of a file as they arrive, and is thus unable to perform useful work on the file's contents before its entire length has been transferred. As this process may take ten or twenty minutes for a typical file of around a megabyte, the equipment shown in FIG. 6 provides an extremely inefficient mechanism for the downloading of large documents of structured graphical data.

A solution to this problem is to improve the speed of data transfer over the public switched telephone network 102 to the modem 601. Various solutions to this continue to be developed, including improved data compression techniques and direct digital connection to the telephone network. However, it is unlikely that foreseeable developments in both of these technologies will relieve the significant bottleneck for the transfer of structured graphical data over the telephone network 102.

The equipment shown in FIG. 6 provides an inefficient mechanism for document retrieval when such documents are in the PDF format, and are of a significant length (greater than a few thousand bytes). Although versatile text and graphics formats such as PDF theoretically provide an improvement in the nature of documents that may be stored on databases, known implementations of systems that provide such facilities have serious disadvantages such as speed of operation, system overhead, and a reduction in the amount of work which may be done while files are being down-loaded.

A possible solution would be to generate graphical data having a structure different to that shown in FIG. 5. However a large number of desk-top publishing and similar systems already exist that are configured to create large amounts of useful data using PostScript compatible equipment. PostScript files may be easily converted to the PDF format, and this represents an extremely valuable potential source of data for an on-line database server. Thus, although modifications to existing equipment may be envisaged, it would be better if files produced in the old format could somehow be used without the need for significant modifications to the operations already performed on existing equipment.

Figure 7:
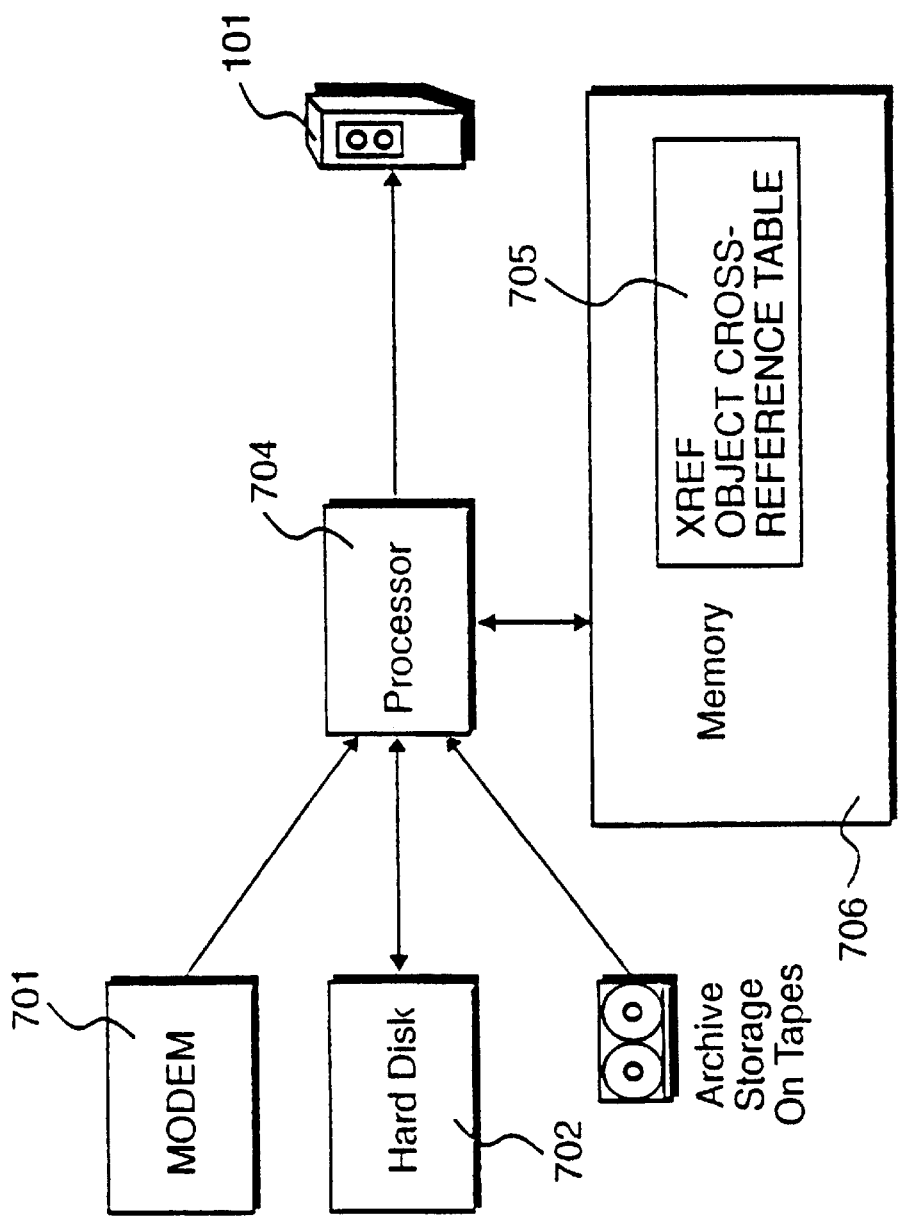
FIG. 7 details equipment required to perform a re-organisation of the file structure shown in FIG. 5, including an object cross-reference table.

Knowledge of the contents of the four byte file offset pointer, supplied at the end of any file configured to the PDF format, is required by the processor 602 in order to determine the whereabouts of the xref table 501, and thus all object definitions within the file, before any of the object references can be used to draw an image on a graphical display unit. However, FIG. 7 shows an apparatus for re-organising existing PDF files structured in the manner indicated in FIG. 5, into a file having a different structure, yet which remains compliant with the PDF standard.

Existing PDF files in the structure of FIG. 5 are supplied over a modem 701, from a hard disk 702, or from archive tape storage media 703 to a processor 704. The processor 704 accesses a memory unit 706 and an object cross-reference table 705 to generate a file having a modified structure, which is then suitable for storage and subsequent use on the database server 101. Thus the equipment shown in FIG. 7 is intended for use mainly at the initial stage of configuring a database before it is actually used by calling customers. The equipment shown in FIG. 7 may also be used to update the database 101 with new data files, which may replace or be added to database files which already exist on the server 101.

The PDF format is a widely recognised standard, and source files for the database may exist on some other database at a remote site anywhere in the world. Thus the modem 701 may be used to transfer such files from a remote location to the site of the re-organising equipment shown in FIG. 7. The database company may have equipment for generating new files in the known PDF structure, for example by transcribing or scanning magazine articles, newspapers and academic literature. These files may be stored locally on a hard disk 702.

Over time it is expected that the number of database companies will increase rapidly. Naturally, several of these may be in a position to sell entire data archives, containing several hundreds of megabytes or even gigabytes of data, which may be stored on reel-to-reel archive tapes. Such tapes may be physically loaded onto a reel-to-reel digital tape playing apparatus 703, for subsequent transfer to the database file server 101.

Figure 8A:
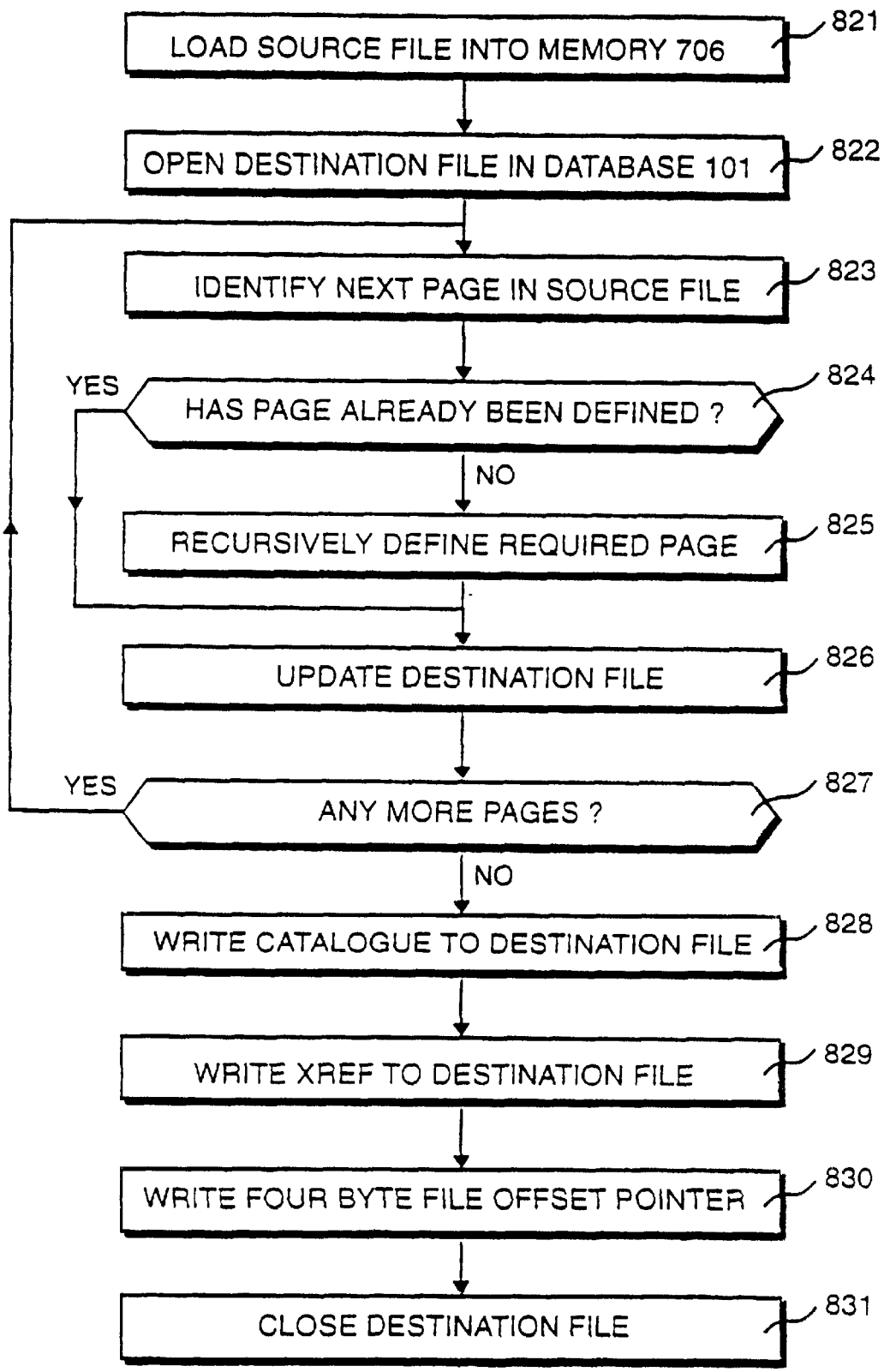
FIG. 8A details procedures performed by the equipment shown in FIG. 7, including re-cursively defining objects and pages.

FIG. 8A details processes performed by the equipment shown in FIG. 7 while re-organising a file having the structure shown in FIG. 5. In process 821 the source file is loaded into the memory 706. The source file may be downloaded from the modem 701, hard disk 702 or archive tape storage 703. Once present in the memory 706, it will be possible for the processor 704 to access and manipulate the data representing the file at a high speed, and thus perform the reorganising process more efficiently than if, for example, the source file had been stored on a slow temporary storage medium, such as the hard disk drive 702.

In process 822 a destination file is opened in the database file server 101. The process of opening the file on the file server 101 has the effect of defining an area on the storage medium of the file server into which new data may be written. Typically such an area will be a few kilobytes in length, and as the re-organised file is written to the storage medium, additional areas will be assigned on the storage medium as and when they are required. Furthermore, each such area need not be physically contiguous with a preceding or subsequent area when a large file is being stored. Thus, a small file which may have been deleted from the database leaves a gap which may be used up at a later date by a much larger file.

In process 823 the source file's catalogue object is examined to find the first (or on subsequent iterations, the next) page object in the source file. Because of the way PDF operates, pages may be defined as objects within other pages. This is explained in detail, with examples, in the Portable Document Reference Manual, available from Adobe Systems Incorporated, ISBN 0-201-62628-4.

Thus, it is possible that a reference is encountered to a page which has already been defined, even though each page reference is examined sequentially in the source file. In process 824 a test is performed to see whether the page has already been defined. If the page has been defined, control is directed to process 826, where the destination file is updated with the new page reference.

Alternatively, if the page has not been defined, control is directed to process 825, where a recursive definition of the page object and its contents is performed. The recursive definition simply means that within the page definition, other objects may be defined, such as graphical objects, and within these objects other objects may be defined, and so on. Thus when defining a page, it becomes necessary to define all those objects within that page. When defining an object, it becomes necessary to define all objects which are used as part of that object. Furthermore, pages may be defined within pages. Once a page and its contents have been defined, control is directed to process 826, where the contents of the destination file are updated as necessary.

In process 827 a question is asked as to whether there are any remaining pages left in the file. If the outcome of this decision is 'YES', control is directed to process 823, where the next page is considered. Alternatively, control is directed to process 828. In process 828 the catalogue object, containing references to the previously defined page objects, is written to the destination file. In process 829, the cross reference table xref, containing pointers to each of the objects in the file, in the numerical order of the objects, is written to the destination file. In process 830 the four-byte file offset pointer to the xref table is appended to the destination file. In process 831 the destination file is closed. The effect of closing the destination file is to update a series of file pointers encoded within the directory structure of the storage medium used in the database server 101, such that the length and location of the destination file is known and finite.

Figure 8B:
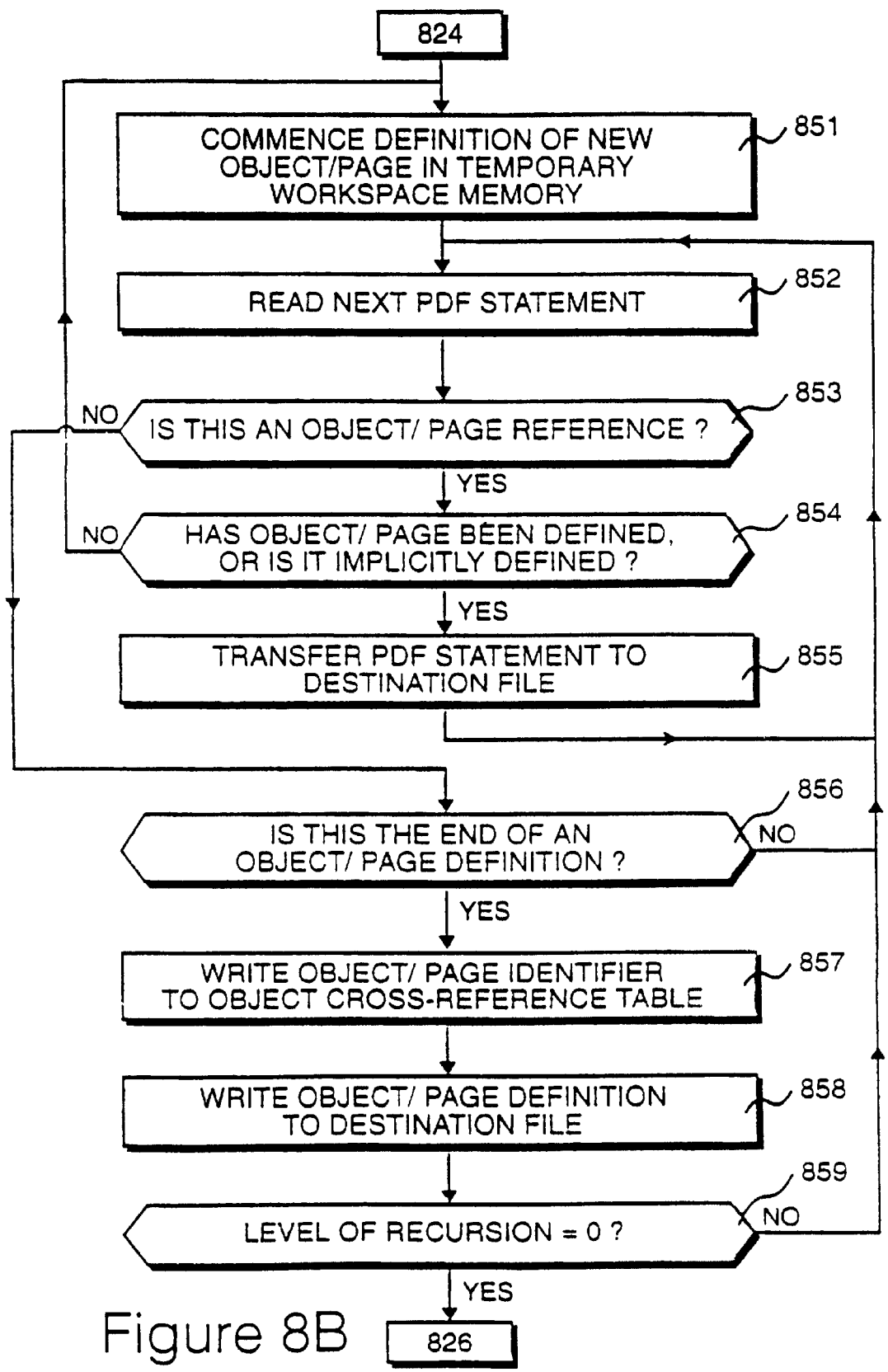
FIG. 8B details the process of re-cursively defining objects and pages shown in FIG. 8A, including accessing said object cross-reference table.

The process 825 for re-cursively defining a page object, shown in FIG. 8A, is detailed in FIG. 8B. In process 851, the contents of a temporary workspace in memory are initialised to a condition such that a new object or page may be defined. Note that, within this workspace area of memory, several pages or objects may be constructed and defined simultaneously, as several levels of recursion may be used. In process 852, the next PDF statement is read. In process 853 a question is asked as to whether the PDF statement read in process 852 represents another object or page reference.

If the PDF statement is a reference to an object or a page, control is directed to process 854, where a question is asked as to whether the object or page has already been defined. If there is no existing definition for the object or page in the destination file, it will be necessary to define it before further progress is made. Thus control is directed back to process 851. When an embedded object definition is initiated in this way, the level of recursion is incremented. If, at process 854, the referenced object or page has already been defined, or alternatively no definition is required because the object is a simple one and is defined within the PDF statement, all that is required is to transfer the PDF statement to the destination file.

If, at process 853, an object or page reference is not identified, control is directed to process 856, where a question is asked as to whether the current PDF statement defines the end of an object or page definition. If this is not the case, control is directed back to process 852. Alternatively, control is directed to process 857, where the object or page identifier is written to the object cross reference table. In process 858, the object or page definition itself is written to the destination file. If a page definition has been completed, the page definition will also include a page cross-reference table (distinct from the object cross-reference table, xref, which includes short codes relating all the objects referenced within the page to their absolute position in the file. This represents a form of data compression, or a reduction in PDF statement complexity, so that long explicit addresses do not have to be used when referencing the same object many times within the same page.

At process 859, a test is performed to see if the level of recursion is zero. As described previously, when object references are embedded within each other, their definitions are generated re-cursively. As each embedded object or page definition is commenced, the level of recursion increases by one. As each embedded object or page definition is completed, the level of recursion is reduced, by the same amount. Thus, if at process 859, the level of recursion is greater than zero, the object or page definition which has just been completed is not the last within the recursive loop. Using this approach, the processes shown in FIG. 8B will re-cursively define all objects within the page object identified in process 823 shown in FIG. 8A.

The object cross-reference table 705 shown in FIG. 7 is used during the process of re-organisation shown in FIG. 8A to build up a cross-reference of objects which have already been used. Typical contents of the object cross-reference table 705 shown in FIG. 7 are detailed in FIG. 9.

Figure 9:
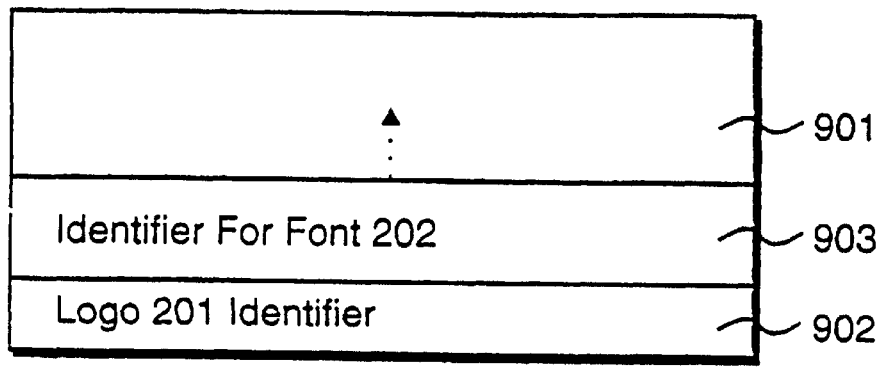
FIG. 9 details the contents of the object cross-reference table shown in FIG. 7, accessed during the procedures detailed in FIG. 8A.

In the example shown in FIG. 9, the object cross-reference table contents 901 include an identifier 902 for the logo 201 shown in FIG. 2 and an identifier 903 for font 202. Thus, in process 854 of the procedure shown in FIG. 8B, where a question is asked as to whether an object has already been defined, a series of comparisons is performed with the object currently under consideration and the contents of the object cross-reference table 705.

Figure 10:
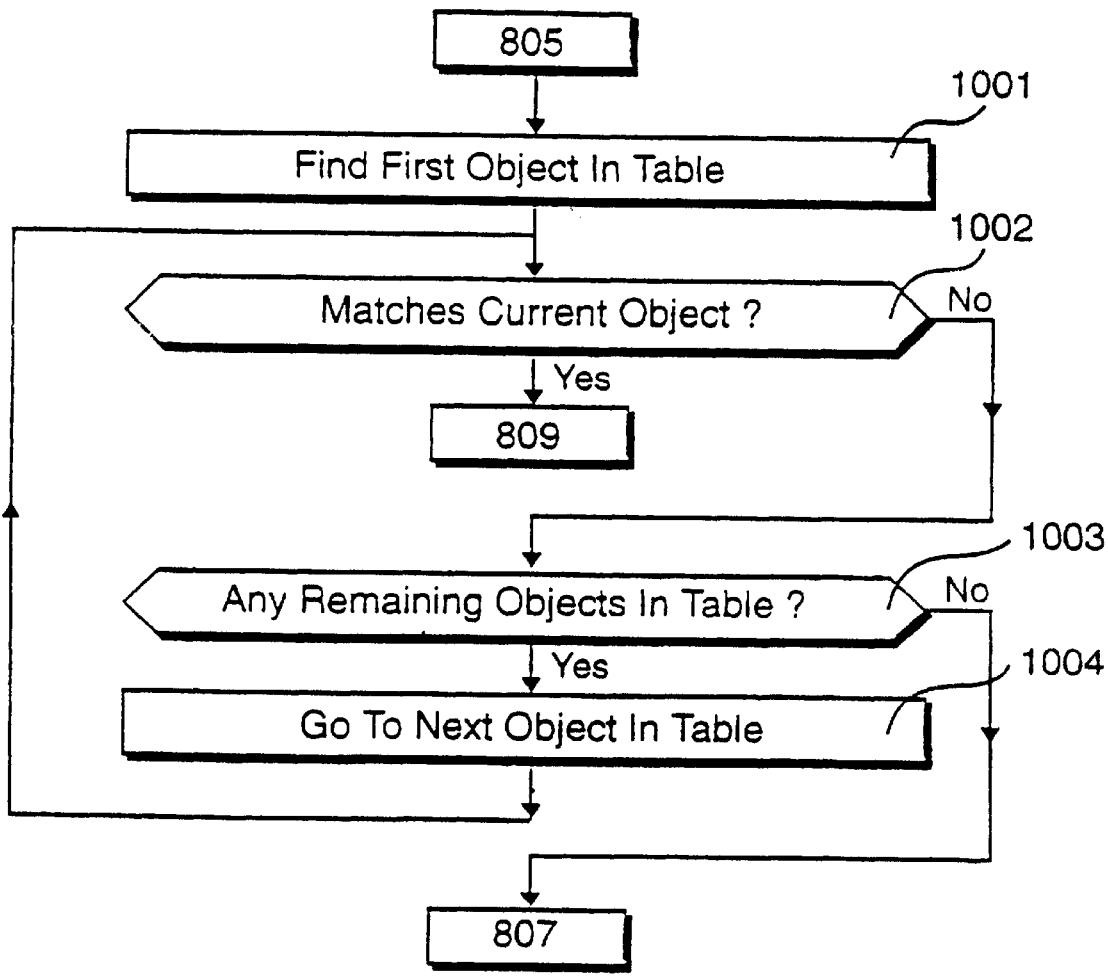
FIG. 10 details procedures performed while accessing the object cross-reference table shown in FIG. 7, the contents of which are shown in FIG. 9.

Process 854, shown in FIG. 8B, in which a test is performed to see whether an object or page has already been defined, is amplified in the procedures detailed in FIG. 10. In process 1001 the first object or page in the object cross-reference table 901 is identified. In process 1002 a question is asked as to whether the first object 902 in the object cross-reference table 901 matches the object currently under consideration. If the outcome of this decision is "YES", control is directed to process 851 in FIG. 8B. If the current object does not match the first object 902 selected from the object cross-reference table 901, control is directed to process 1003. In process 1003 a question is asked as to whether there are any remaining objects in the object cross-reference table 705 to be checked. If there are no remaining objects, control is directed to process 855 in FIG. 8B. If there are any remaining objects, control is directed to process 1004, where the next object 903 in the object cross-reference table 705 is taken into consideration. Thereafter control is directed back to process 1002 and steps 1002 to 1004 are repeated, as previously described. Thus, the object cross-reference table 705 forms an integral part of the process of re-organising the structure of the source file for inclusion as part of the database on the database server 101.

Once the process of re-organisation has been performed by the equipment shown in FIG. 7, according to the procedures detailed in FIG. 8A, FIG. 8B and FIG. 10, the result is a re-organised file having the structure identified in FIG. 11. FIG. 11 may be compared directly with FIG. 5. Both files have similar contents, but with their objects arranged in a different order.

Reading from the start of the file shown in FIG. 11, it may be seen that definitions of objects which are referred to in page definition 213 are defined before page 213. This is also the case with page 214.

The objects which are referred to in the definition of page 215, which is also shown graphically in FIG. 2, are shown individually in FIG. 11. The definitions of the logo 201, text fonts 202, 203 and the graphic 205 each occur before the page definition 215 in which they are used. The catalogue for the document 211, the xref table 501 and the four-byte end of file offset pointer are all included in the new file, albeit with modified contents, in order to maintain full compatibility with the PDF standard. Furthermore, objects defined within a page, such as a font object, need only be defined once in a file, and thereafter used in any page within that file.

In order to view the file having the structure shown in FIG. 11, the graphics terminal 103 shown in FIG. 1 includes equipment which will be described with reference to FIG. 12. Compared with FIG. 6, which is a known graphics terminal 103 of the type shown in FIG. 1, the equipment shown in FIG. 12 includes two additional items; consisting of, firstly, a recognition look-up table 1203 and, secondly, an object definition look-up table 1204.

A file may be downloaded from the database server 101 over the public switched telephone network 102, via the modem 1201 and processor 1202 into a memory 1205. By repeatedly accessing the recognition look-up table 1203 and dynamically updating the object definition look-up table 1204, the processor 1202 may generate suitable instructions for the graphical display processor 1207, such that the contents of a file may be viewed on the graphics monitor 1208 as they arrive, rather than after the entire contents have been received.

Figure 12:
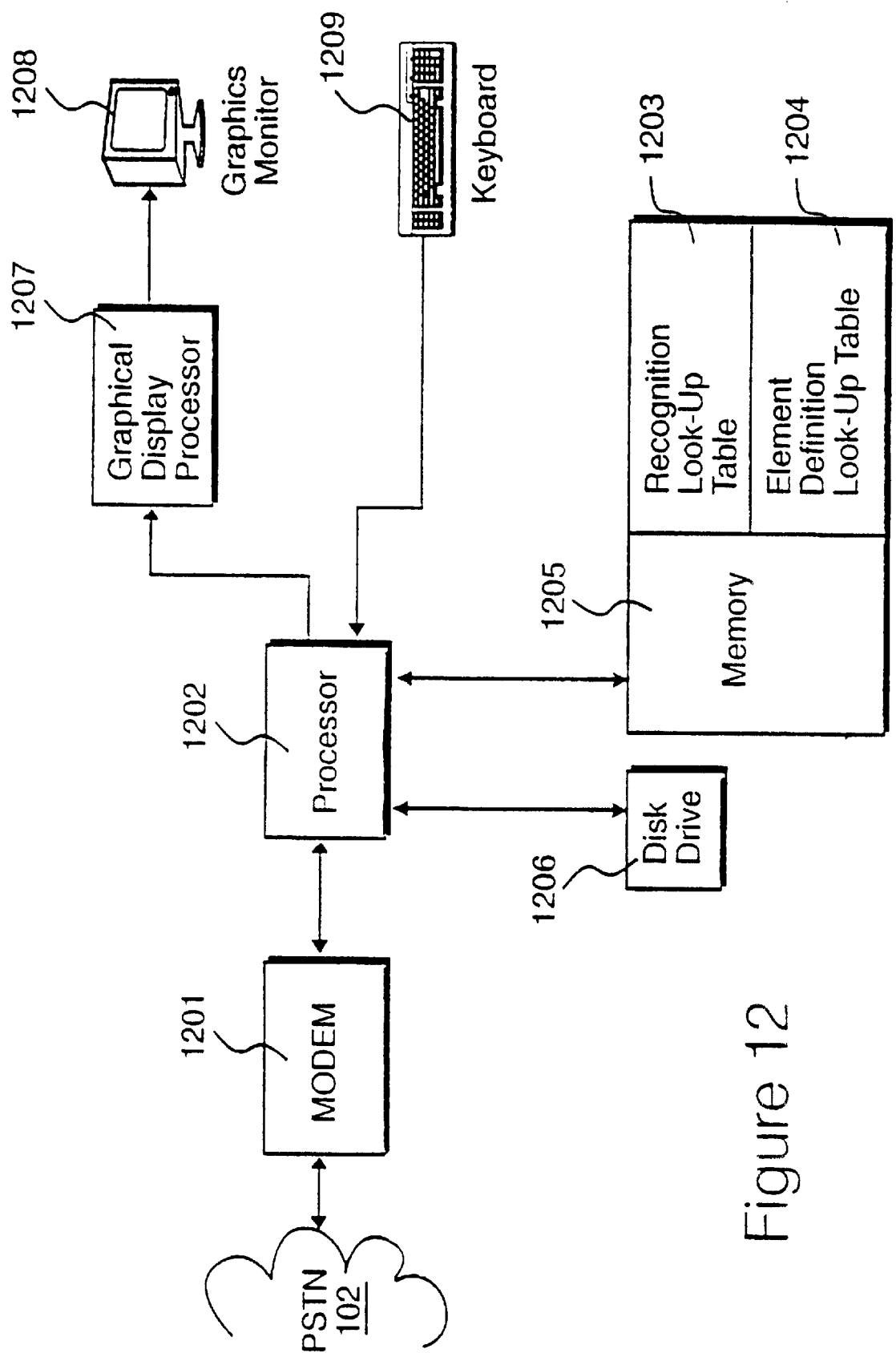
FIG. 12 details equipment contained within a modified graphics terminal of the type shown in FIG. 1, used to view the file structure shown in FIG. 11, including a recognition look-up table and an object definition look-up table.
Figure 13:
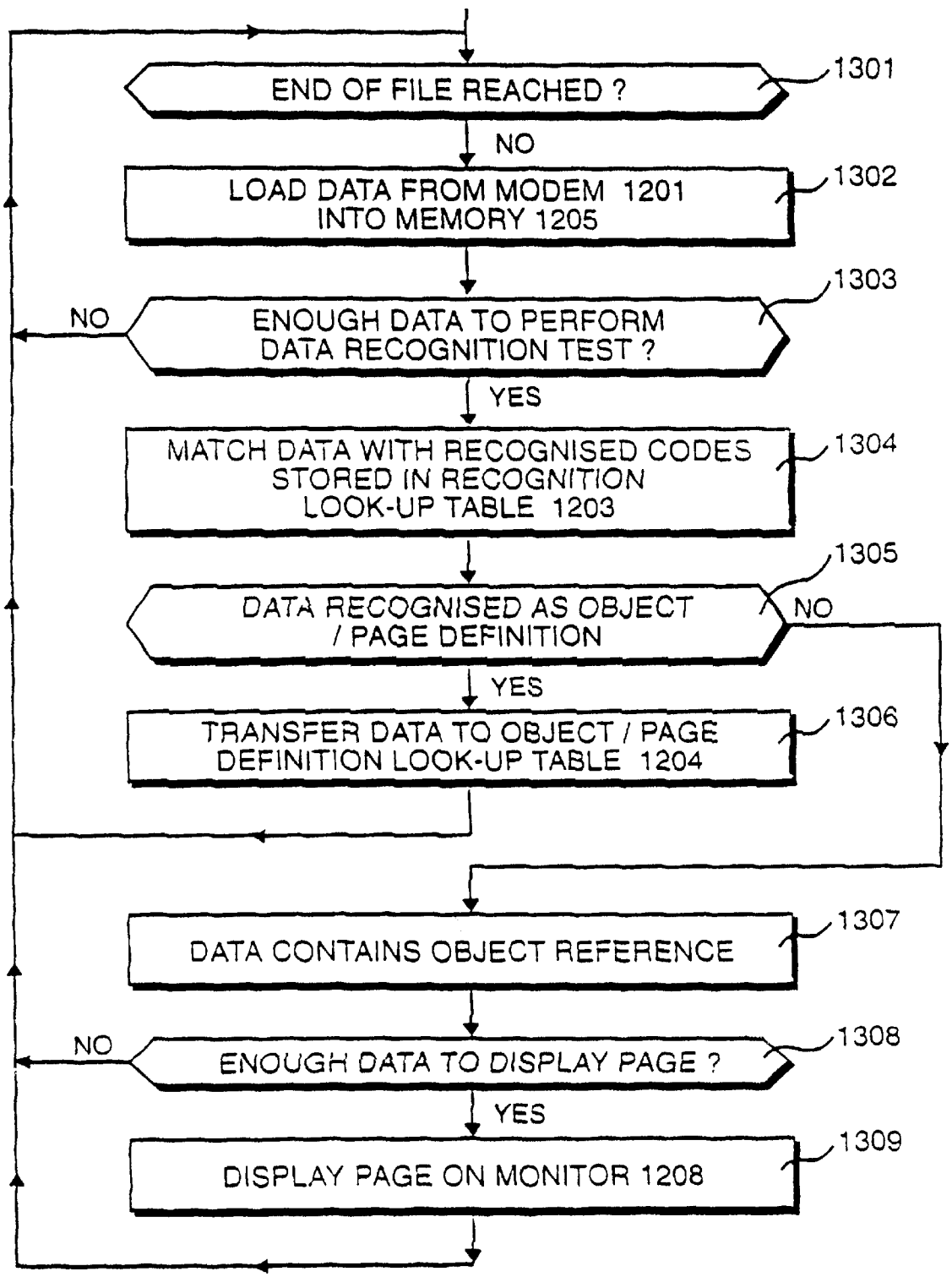
FIG. 13 details procedures performed by the equipment shown in FIG. 12 while down-loading a file of the type shown in FIG. 11, including accessing said recognition look-up table.

The processes performed by the equipment shown in FIG. 12 are summarised as a flowchart in FIG. 13. In process 1301 a question is asked as to whether all the contents of a particular file have yet been down-loaded. If an entire file has been downloaded, control is directed to another process, where another file may be considered for downloading.

In process 1302 data is loaded from the modem 1201 into the memory 1205 via the processor 1202. Data is transferred in blocks containing two hundred and fifty-six bytes. Thus in process 1302, two hundred and fifty-six new characters are loaded into the memory 1205. In process 1303 a question is asked as to whether enough data has been loaded to perform a recognition test. If this question is answered in the negative, control is directed to process 1301, whereupon more data is downloaded.

In process 1304 the incoming data is matched against the recognised codes which are stored in the recognition look-up table 1203. By doing this, it is possible to ascertain whether the data contains an object definition or an object reference. Furthermore it is possible to determine what type of object has been defined or which references have been supplied. In process 1305 a question is asked as to whether the data has been recognised as being a definition of an object or a page. If a definition is recognised, control is directed to process 1306, where the data that has just been examined is transferred from the memory 1205 into the object and page definition look-up table 1204. Thereafter control is directed to process 1301, and steps 1301 to 1306 are repeated as before.

In process 1307 it is known that the data currently under consideration, which has just been downloaded into the memory 1205, contains object references. In process 1308 a question is asked as to whether enough data references have been received to display a page. If the outcome of process 1308 is 'NO', control is directed to process 1301. Alternatively control is directed to process 1309, where a page is rendered on the graphics monitor 1208.

By comparing incoming codes and performing a recognition test on them, it becomes possible to identify incoming object and page definitions without needing to access the four byte file offset pointer which, even in the re-organised format, only arrives at the end of the file in order to maintain PDF compatibility. Thus, provided that each object is defined before Its references arrive, it is possible to render objects onto the display as soon as their references are received, or alternatively, a page at a time. Furthermore, by dynamically building a library of object definitions in the object definition look-up table 1204, objects which have previously been defined can be rendered graphically whenever references for those objects appear in subsequent pages in the file.

The processes shown in the flow chart of FIG. 13 are repeated until the entire file's contents have been downloaded or the process of downloading a file is cancelled. Once a file has been completely downloaded, it is possible for the file to be browsed through in its entirety.

Thus incoming object references may be combined with previously stored object definitions in the object definition look-up table 1204, by the processor 1202, in order to supply appropriate graphical display commands to the graphical display processor 1207. Electrical signals representing a page of the file may then be supplied to the graphics monitor 1208.

The invention can be seen to provide an advantage for transmitting and viewing complex structured graphical data files whenever these data files are to be transferred over a communications medium which has a restricted bandwidth. Clearly this is the case with the public switched telephone network 102 shown in FIG. 1. This may also apply to other slow data transfer media, such as optical disks, tape streamers, and mobile telephone data communications devices.

Figure 14:
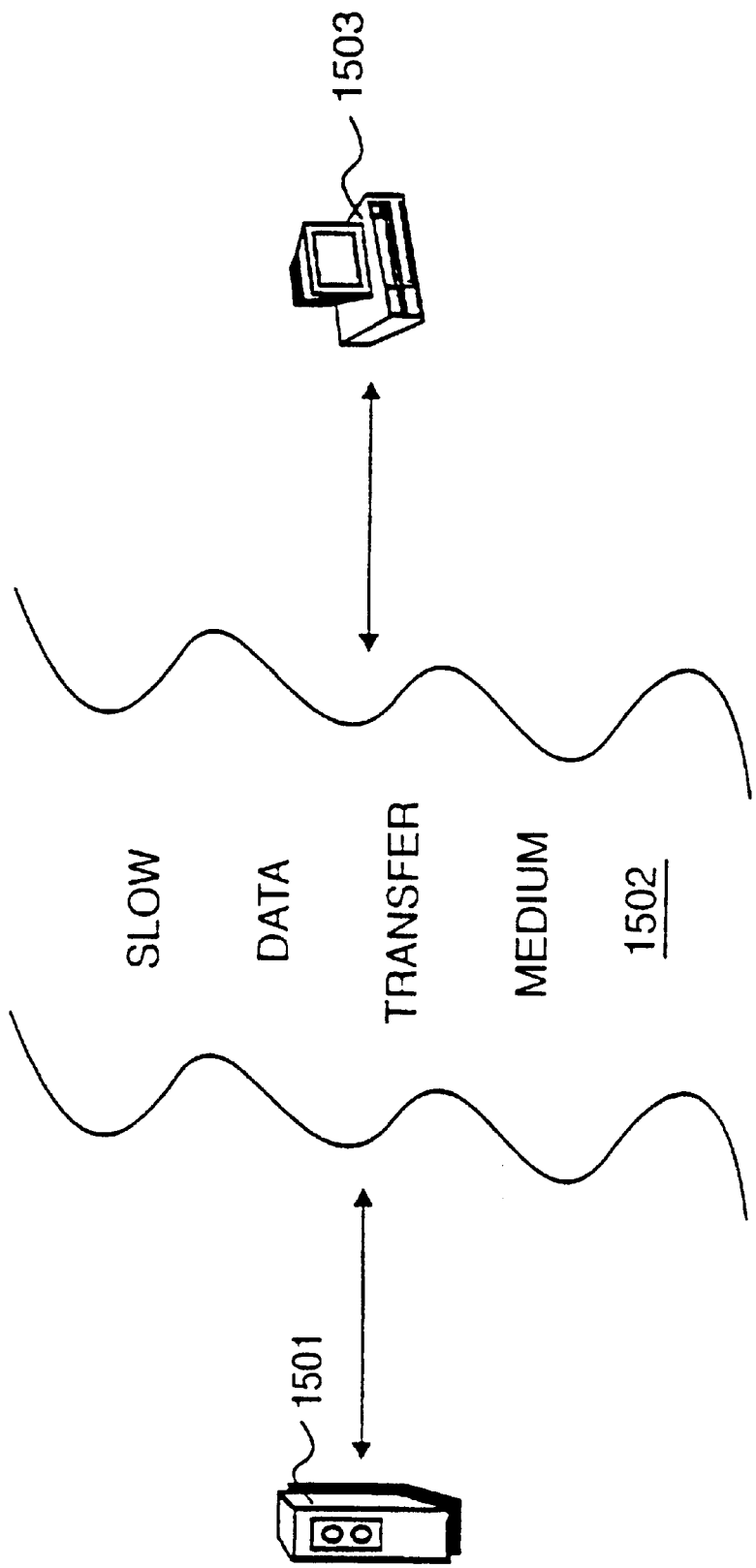
FIG. 14 summarises an alternative embodiment of the present invention.

An alternative embodiment is shown in FIG. 14. A file server 1501 supplies files containing mixed graphics and text, via a slow data transfer medium 1502, to a graphical viewing apparatus 1503. The alternative embodiment shown in FIG. 14 represents a number of possible environments where the specific implementations described in the preceding text may be used to provide an improvement in the speed at which information may be accessed.

We claim:

1. A system for making data available to a plurality of viewing stations, comprising data storage apparatus and means for writing received data to said data storage apparatus, wherein said writing means receives data defined in accordance with a standard document format having object definitions, references to said object definitions and a structure table, wherein said data is re-organised so that said graphical object references are preceded by their respective object definitions to facilitate incremental viewing of said data at remote terminals without reference to said table, and a new reference table is supplied to a destination file after page objects have been identified, thereby maintaining said data as being compatible with the original document format.

2. A system according to claim 1, wherein a plurality of page objects are identified, a plurality of referenced objects are defined and all definitions for a particular page are supplied to a destination file before their associated page object.

3. A system according to claim 1, wherein a referenced object includes additional page objects and said additional page objects are defined recursively within a destination file.

4. A system according to claim 1, wherein, at each viewing station, object definitions are received, an object reference table is incrementally reconstructed, and a page object is displayed with objects referred to therein being displayed with reference to the reconstructed cross reference table and to the received object definitions.

5. A system according to claim 4, wherein the object definitions are consistent with portable document format (PDF).

6. A system for making data available to a plurality of viewing stations, comprising data storage apparatus and means for writing received data to said data storage apparatus, wherein said writing means receives data defined in accordance with a standard document format having object definitions, references to said object definitions and a structure table, wherein said data is re-organised so that said graphical object references are preceded by their respective object definitions to facilitate incremental viewing of said data at remote terminals without reference to said table, and an object reference table is incrementally reconstructed, and a page object is displayed with objects referred to therein being displayed with reference to the reconstructed cross reference table and to the received object definitions.

7. A system according to claim 6, wherein the object definitions are consistent with portable document format (PDF).

8. A system according to claim 6, wherein a plurality of page objects are identified, a plurality of referenced objects are defined and all definitions for a particular page are supplied to a destination file before their associated page object.

9. A system according to claim 6, wherein a referenced object includes additional page objects and said additional page objects are defined recursively within a destination file.

10. A system according to claim 6, wherein a new reference table is supplied to a destination file after page objects have been identified which, although not required, maintain said data as being compatible with the original document format.

* * * * *